US008696199B2

(12) United States Patent
St. Pierre et al.

(10) Patent No.: US 8,696,199 B2
(45) Date of Patent: Apr. 15, 2014

(54) PROPORTIONAL SETTLING TIME ADJUSTMENT FOR DIODE VOLTAGE AND TEMPERATURE MEASUREMENTS DEPENDENT ON FORCED LEVEL CURRENT

(75) Inventors: Robert St. Pierre, Tucson, AZ (US); Scott C. McLeod, Oro Valley, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 273 days.

(21) Appl. No.: 12/211,673

(22) Filed: Sep. 16, 2008

(65) Prior Publication Data
US 2009/0009234 A1 Jan. 8, 2009

Related U.S. Application Data

(62) Division of application No. 11/068,250, filed on Feb. 28, 2005, now Pat. No. 7,429,129.

(51) Int. Cl.
*G01K 7/01* (2006.01)
(52) U.S. Cl.
USPC ........... 374/178; 327/513; 323/907; 702/130; 257/467
(58) Field of Classification Search
USPC ............. 374/1, 170–173, 163, 183, 100, 141, 374/178; 702/90, 130–136; 327/512, 513; 257/467, 470
See application file for complete search history.

(56) References Cited

U.S. PATENT DOCUMENTS

| | | | |
|---|---|---|---|
| 3,672,215 A | 6/1972 | Stout et al. | |
| 3,679,992 A | 7/1972 | Yerman | |
| 4,061,033 A | 12/1977 | Nixon | |
| 4,228,684 A | 10/1980 | Templin | |
| 4,296,632 A * | 10/1981 | Bloomer et al. | 374/171 |
| 4,298,947 A | 11/1981 | Tamura et al. | |
| 4,537,518 A | 8/1985 | Murase | |
| 4,565,456 A | 1/1986 | Iida et al. | |
| 4,636,092 A | 1/1987 | Hegyi | |
| 4,764,748 A * | 8/1988 | Geen et al. | 341/131 |
| 5,195,827 A | 3/1993 | Audy et al. | |
| 5,226,733 A | 7/1993 | Mitchell et al. | |
| 5,294,200 A * | 3/1994 | Rall | 374/120 |
| 5,347,224 A * | 9/1994 | Brokaw | 324/522 |
| 5,419,637 A | 5/1995 | Frye et al. | |
| 5,461,584 A * | 10/1995 | Ikuta et al. | 327/516 |
| 5,619,430 A * | 4/1997 | Nolan et al. | 702/63 |
| 5,663,899 A * | 9/1997 | Zvonar et al. | 702/130 |
| 5,982,221 A | 11/1999 | Tuthill | |
| 5,991,700 A * | 11/1999 | Clay et al. | 702/131 |
| 6,008,685 A * | 12/1999 | Kunst | 327/512 |
| 6,097,239 A | 8/2000 | Miranda, Jr. et al. | |
| 6,169,442 B1 | 1/2001 | Meehan et al. | |
| 6,554,469 B1 * | 4/2003 | Thomson et al. | 374/178 |
| 6,554,470 B2 | 4/2003 | Zhang et al. | |
| 6,636,934 B1 | 10/2003 | Linnell et al. | |
| 6,637,934 B1 | 10/2003 | Henderson et al. | |
| 6,736,540 B1 | 5/2004 | Sheehan et al. | |
| 6,847,319 B1 | 1/2005 | Stockstad | |
| 6,888,469 B2 | 5/2005 | Seferian | |
| 6,962,436 B1 * | 11/2005 | Holloway et al. | 374/170 |
| 7,010,440 B1 | 3/2006 | Lillis et al. | |
| 7,052,180 B2 * | 5/2006 | Shih | 374/178 |
| 7,140,767 B2 | 11/2006 | McLeod | |
| 7,193,543 B1 * | 3/2007 | McLeod et al. | 341/123 |
| 7,281,846 B2 | 10/2007 | McLeod | |
| 7,332,952 B2 * | 2/2008 | McLeod et al. | 327/512 |
| 7,341,374 B2 * | 3/2008 | Chiu | 374/1 |
| 7,429,129 B2 * | 9/2008 | St. Pierre et al. | 374/178 |
| 7,492,293 B2 * | 2/2009 | Short et al. | 341/123 |
| 7,622,903 B2 * | 11/2009 | McLeod | 323/278 |
| 7,988,354 B2 * | 8/2011 | Jansen | 374/170 |
| 2003/0039299 A1 * | 2/2003 | Horovitz et al. | 374/141 |

| | | | |
|---|---|---|---|
| 2006/0161373 A1* | 7/2006 | Mangrulkar et al. | 702/130 |
| 2006/0203883 A1* | 9/2006 | Griffin | 374/178 |
| 2006/0265174 A1 | 11/2006 | Doyle et al. | |
| 2007/0055473 A1* | 3/2007 | McLeod | 702/130 |
| 2008/0032655 A1 | 2/2008 | Kawasaki et al. | |
| 2008/0065345 A1 | 3/2008 | Ooghe | |
| 2008/0215283 A1* | 9/2008 | Sri-Jayantha et al. | 702/130 |
| 2008/0259999 A1* | 10/2008 | Gardner et al. | 374/178 |
| 2009/0167414 A1* | 7/2009 | Jansen | 327/513 |
| 2010/0002748 A1* | 1/2010 | Lin et al. | 374/170 |
| 2010/0327183 A1* | 12/2010 | Baltz et al. | 250/458.1 |
| 2011/0096875 A1* | 4/2011 | Amrutur et al. | 375/343 |

FOREIGN PATENT DOCUMENTS

| | | |
|---|---|---|
| DE | 3637520 | 5/1988 |
| EP | 0498799 | 8/1992 |
| EP | 0741860 | 11/1996 |
| GB | 2292221 | 2/1996 |

OTHER PUBLICATIONS

Chen, et al.; "Channel Temperature Measurement Using Pulse—Gate Method"; IEEE Transactions on Microwave Theory and Techniques; vol. 47, Issue 3; Mar. 1999; pp. 362-365.

Hui, et al., "Circuit Design and Implementation for Digital Temperature and Humidity Measurement and Control"; Proceedings of the 4th International Conference on ASIC; Oct. 23-25, 2001; pp. 502-505.

Kaliyugavaradan, et al.; "Application of Reciprocal Time Generation Technique to Digital Temperature Measurement"; IEEE Transactions on Instrumentation and Measurement; vol. 43, Issue 1; Feb. 1994; pp. 99-100.

* cited by examiner

*Primary Examiner* — Gail Verbitsky

(74) *Attorney, Agent, or Firm* — King & Spalding L.L.P.

(57) ABSTRACT

A temperature sensor circuit and system providing accurate digital temperature readings using a local or remote temperature diode. In one set of embodiments a change in diode junction voltage ($\Delta V_{BE}$) proportional to the temperature of the diode is captured and provided to an analog to digital converter (ADC), which may perform required signal conditioning functions on $\Delta V_{BE}$, and provide a digital output corresponding to the temperature of the diode. DC components of errors in the measured temperature that may result from EMI noise modulating the junction voltage ($V_{BE}$) may be minimized through the use of a front-end sample-and-hold circuit coupled between the diode and the ADC, in combination with a shunt capacitor coupled across the diode junction. The sample-and-hold-circuit may sample $V_{BE}$ at a frequency that provides sufficient settling time for each $V_{BE}$ sample, and provide corresponding stable $\Delta V_{BE}$ samples to the ADC at the ADC operating frequency. The ADC may therefore be operated at its preferred sampling frequency rate without incurring reading errors while still averaging out AC components of additional errors induced by sources other than EMI.

20 Claims, 7 Drawing Sheets

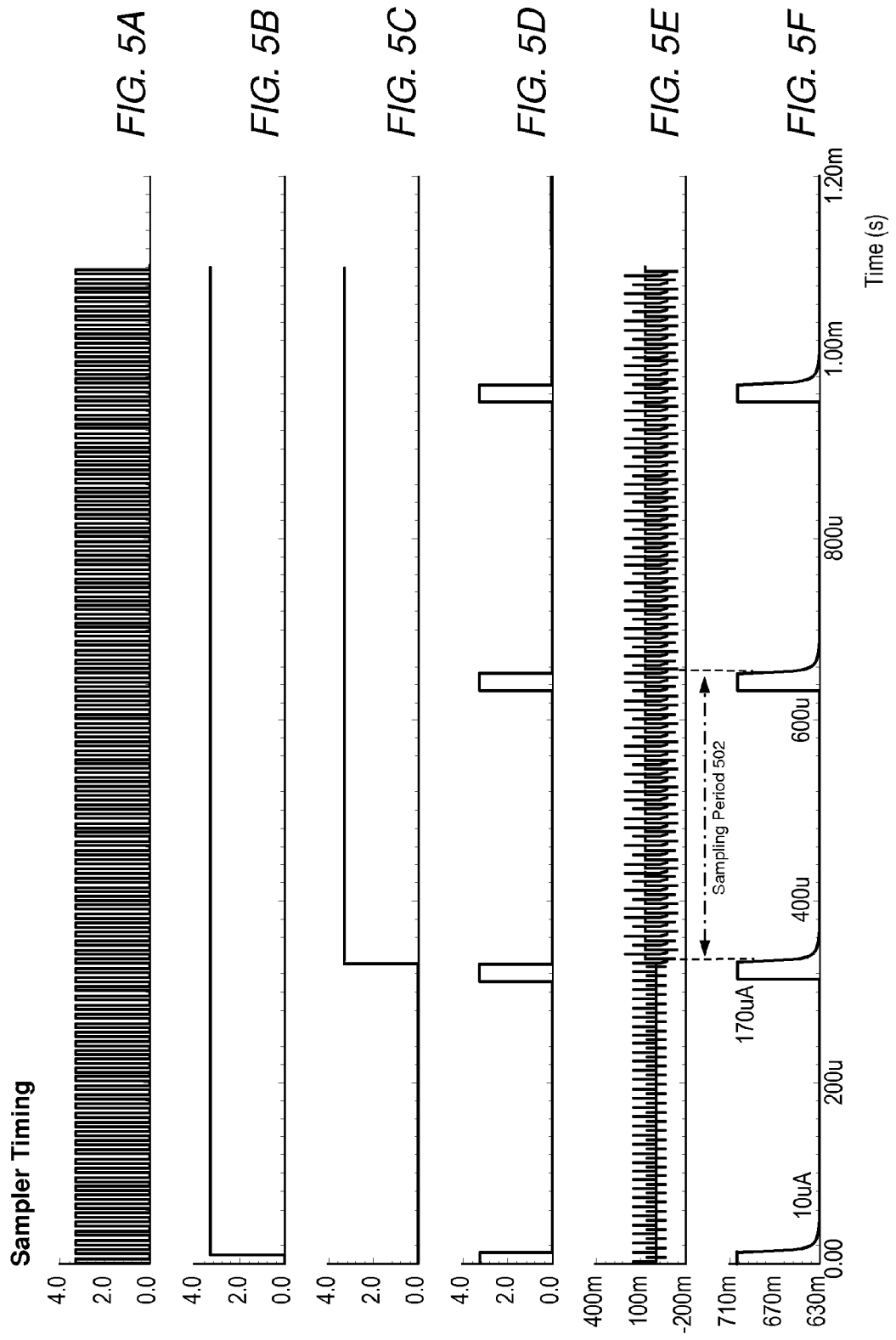

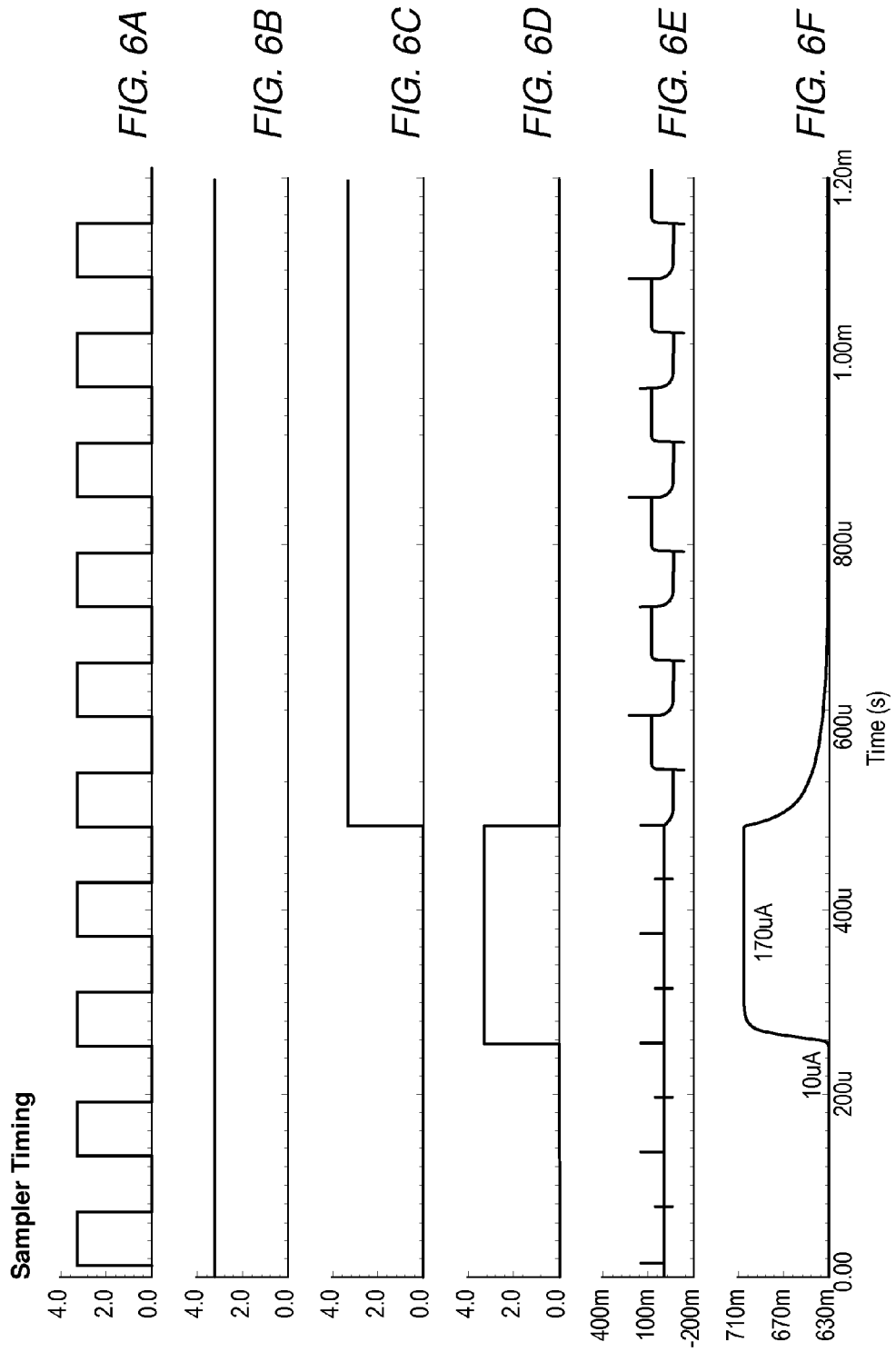

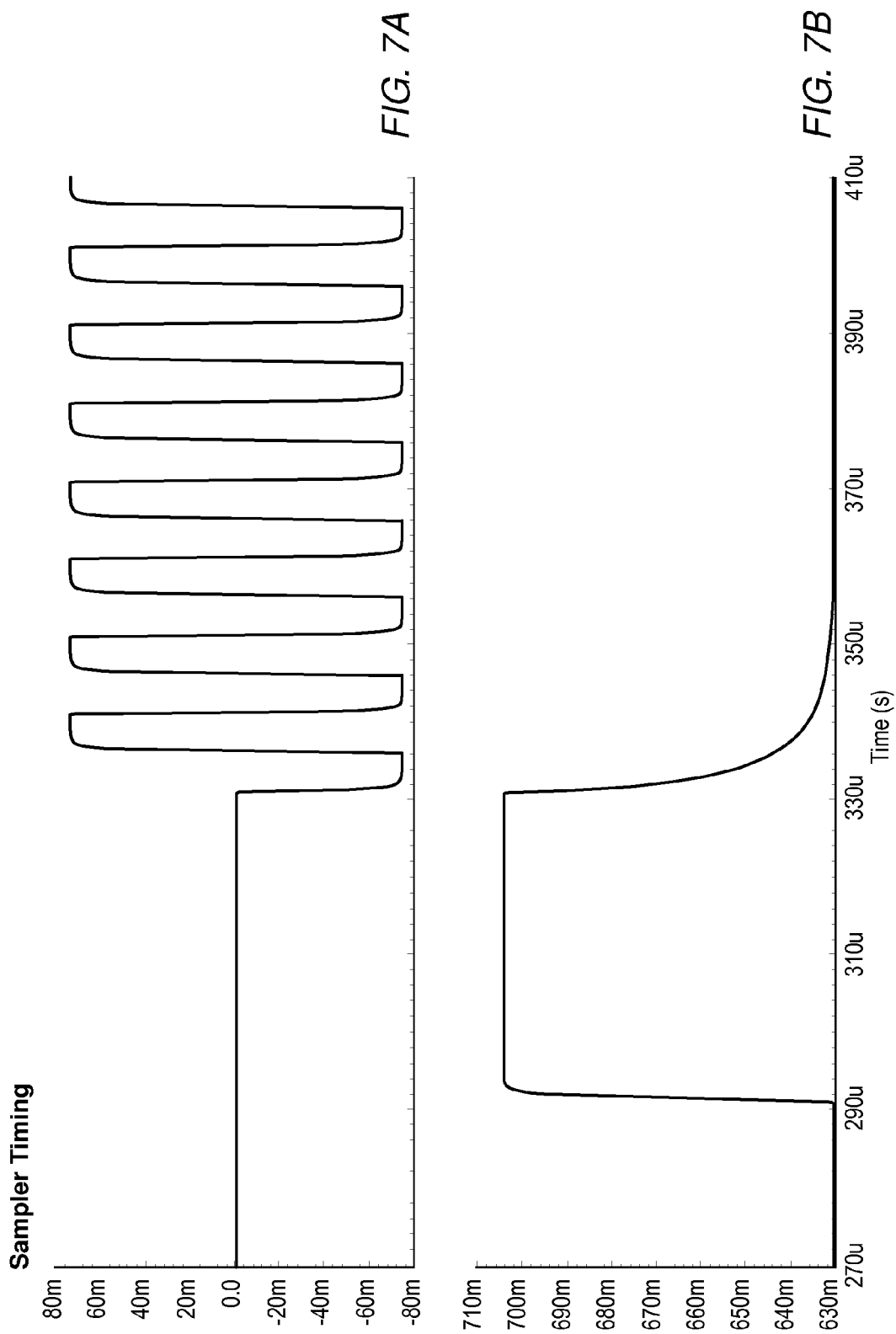

PROPORTIONAL SETTLING TIME ADJUSTMENT FOR DIODE VOLTAGE AND TEMPERATURE MEASUREMENTS DEPENDENT ON FORCED LEVEL CURRENT

CONTINUATION DATA

This application is a divisional of application Ser. No. 11/068,250 titled "Proportional Settling Time Adjustment For Diode Voltage And Temperature Measurements Dependent On Forced Level Current" filed on Feb. 28, 2005, whose inventors are Robert St. Pierre and Scott C. McLeod, and which has issued as U.S. Pat. No. 7,429,129, which is hereby incorporated by reference in its entirety as though fully and completely set forth herein.

FIELD OF THE INVENTION

This invention relates generally to the field of integrated circuit design and, more particularly, to the design of temperature sensor and measurement devices.

DESCRIPTION OF THE RELATED ART

Many digital systems, especially those that include high-performance, high-speed circuits, are prone to operational variances due to temperature effects. Devices that monitor temperature and voltage are often included as part of such systems in order to maintain the integrity of the system components. Personal computers (PC), signal processors and high-speed graphics adapters, among others, typically benefit from such temperature monitoring circuits. For example, a central processor unit (CPU) that typically "runs hot" as its operating temperature reaches high levels may require a temperature sensor in the PC to insure that it doesn't malfunction or break due to thermal problems.

Often, integrated circuit (IC) solutions designed to measure temperature in a system will monitor the voltage across one or more PN-junctions, for example a diode or multiple diodes at different current densities to extract a temperature value. This method generally involves amplifying (or gaining up) a small voltage generated on the diode(s), and then subtracting voltage from the amplified temperature-dependent voltage in order to center the amplified (gained) value for conversion by an analog-to-digital converter (ADC). In other words, temperature-to-digital conversion for IC-based temperature measuring solutions is often accomplished by measuring a difference in voltage across the terminals of typically identical diodes when different current densities are forced through the PN junctions of the diodes. The resulting change ($\Delta V_{BE}$) in the base-emitter voltage ($V_{BE}$) between the diodes is generally proportional to temperature. (It should be noted that while $V_{BE}$ generally refers to a voltage across the base-emitter junction of a diode-connected transistor and not a voltage across a simple PN-junction diode, for the sake of simplicity, $V_{BE}$ is used herein to refer to the voltage developed across a PN-junction in general.) More specifically, a relationship between $V_{BE}$ and temperature is defined by the equation $$V_{BE} = \eta \frac{kT}{q} \ln \frac{I}{I_S} \quad (1)$$

where $\eta$ is the ideality factor of the PN junction, k is Boltzman's constant, q is the charge of a single electron, T represents absolute temperature, $I_s$ represents saturation current and I represents the collector current. A more efficient and precise method of obtaining $\Delta V_{BE}$ is to supply the PN junction of a single diode with two separate and different currents in a predetermined ratio. Consequently, $\Delta V_{BE}$ may be related to temperature by the equation $$\Delta V_{BE} = \eta \frac{kT}{q} \ln(N) \quad (2)$$

where N is a constant representing a pre-selected ratio of the two separate currents that are supplied to the PN junction of the diode.

A typical dynamic range of $\Delta V_{BE}$, however, is small relative to dynamic ranges that are typical of analog-to-digital converters (ADCs). That is, $\Delta V_{BE}$, which is used to measure the PN junction temperature, generally has a small dynamic range, for example on the order of around 60 mV in some systems. Therefore it is generally required to further process $\Delta V_{BE}$ in order to match the dynamic range of ADCs. Typically, in order to obtain the desired conversion values at various temperatures, $\Delta V_{BE}$ is multiplied by a large gain, and then centered to zero, which can be accomplished by subtracting a fixed voltage.

In general, implementations today perform the temperature signal processing (TSP) in a separate temperature sensor circuit that generates a sufficiently large voltage signal, which is fed into a separate ADC that may have been designed using a number of different topologies. Temperature-to-digital converters (TDC) of such implementations usually contain complex circuits with high power dissipation. The yield of these TDCs during the fabrication process may also be low as there are many components that need to be matched for a given process spread.

An example of a typical temperature measurement system, which includes an ADC, is illustrated in FIG. 1. A TSP circuit 100 is coupled to an ADC 130. TSP 100 may comprise current sources 104 and 106, where a current provided by 104 is an integer (N) multiple of a current provided by 106, a diode 102, an integration capacitor 126, an offset capacitor 122, a gain capacitor 124, and an operational amplifier (OP-AMP) 120, interconnected as illustrated in FIG. 1. P1 110 and P2 112 represent non-overlapping clocks that provide switching between two circuit configurations as shown. When P1 110 is closed, current source 104 powers TSP 100 and P2 112 is open. Similarly, when P2 112 is closed, current source 106 powers TSP 100 and P1 110 is open. Switching between current sources 104 and 106, different currents are forced through the junction of diode 102 resulting in a change in diode-junction-voltage ($\Delta V_{BE}$). Although omitted in FIG. 1, it should be understood that when either P1 110 or P2 112 is open, the respective uncoupled current source may be shunted to ground. In the circuit configuration shown, voltage sampling occurs when P1 110 is closed, and charge transfer takes place when P2 112 is closed. In other words, during operation, switching from a configuration of P1 110 closed and P2 112 open to a configuration of P1 110 open and P2 112 closed, results in $\Delta V_{BE}$ effectively "pumping" charge to gain capacitor 124, which in turn leads to integration capacitor 126 also receiving a charge. More specifically, opening P1 110 and closing P2 112 results in a value drop of diode-junction-voltage $V_{BE}$, expressed as $\Delta V_{BE}$. Consequently, $\Delta V_{BE}$ appears across the terminals of capacitor 126, in case capacitor 126 is equal in value to capacitor 124. If capacitor 124 is greater in value than capacitor 126, then $\Delta V_{BE}$ will be amplified, or "gained up", hence an amplified value Vtemp 131 will appear at the output of OP-AMP 120. Voffset 132 is subtracted through offset capacitor 122.

Voltage-temperature relationships characterizing TSP 100 may be described by the following equations:

$$V\text{temp} = C_T/C_I * \Delta V_{BE}(T) - C_O/C_I * V\text{offset, where}$$

$$C_T/C_I = (ADC \text{ dynamic range})/(\Delta V_{BE}(T\max) - \Delta V_{BE}(T\min)), \text{ and}$$

$$V\text{offset} = (C_T/C_I * \Delta V_{BE}(T\max) - (ADC \text{ dynamic range})) * C_I/C_O.$$

Tmax and Tmin represent maximum and minimum diode temperatures, respectively. ADC dynamic range indicates a range of valid voltage values required for proper ADC operation.

In certain cases, for example when diode 102 is a remote diode coupled to OP-AMP 120 through twisted pair wires, the output temperature reading may artificially increase due to system noise. Electromagnetic Interference (EMI) noise may modulate the diode voltage $V_{BE}$, resulting in inaccurate temperature-readings, as ADC 130 will typically not differentiate between a noise-induced temperature increase versus true temperature increase.

Other corresponding issues related to the prior art will become apparent to one skilled in the art after comparing such prior art with the present invention as described herein.

SUMMARY OF THE INVENTION

In one set of embodiments the invention comprises a system and method for performing temperature monitoring in a digital system by capturing a change in a diode junction voltage ($\Delta V_{BE}$), which is proportional to a temperature of the diode, and using an analog-to-digital converter (ADC) to perform required signal conditioning functions on $\Delta V_{BE}$ with the output of the ADC providing a numeric value corresponding to the temperature of the diode. Errors in the measured temperature that may result from EMI noise modulating the junction voltage $V_{BE}$ may be minimized through the use of a front-end sample-and-hold circuit coupled between the diode and the ADC, in combination with a capacitor coupled across the diode junction.

The sample-and-hold circuit may sample the diode voltage when a first current associated with the temperature measurement is forced through the diode junction, and repeat the same for all subsequent diode voltages generated when different currents are forced through the diode junction. In one embodiment, the sample and hold circuit presents the various sampled voltages (VBE's) to the ADC for conversion at the full conversion speed. The overall sample time for each individual generated diode voltage may be dependent on the value of the corresponding current forced through the diode junction. This may allow for the total conversion time to be divided appropriately and proportionally to allow the maximum settling time for forced currents of a lower value, for example a first settling time associated with a first input signal, and the minimum settling time for forced currents of a higher value, for example a second settling time associated with a second input signal. In this manner, high overall conversion rates may be preserved.

Thus, various embodiments of the invention may provide a means for performing temperature monitoring/measurement by applying a $\Delta V_{BE}$ signal to an ADC that performs signal-processing functions, including matching and centering the voltage range of $\Delta V_{BE}$ to the dynamic range of the ADC, while minimizing temperature measurement errors that may arise due to EMI noise interference.

BRIEF DESCRIPTION OF THE DRAWINGS

The foregoing, as well as other objects, features, and advantages of this invention may be more completely understood by reference to the following detailed description when read together with the accompanying drawings in which:

FIGS. 5A-5F illustrate timing diagrams corresponding to one embodiment of a temperature measurement circuit employing an ADC with a coupled sample-and-hold circuit;

FIGS. 6A-6F illustrate the signals of the corresponding timing diagrams of FIGS. 5A-5F on a finer scale;

FIG. 7A illustrates the signal of the corresponding timing diagram of FIG. 6E on a finer scale; and FIG. 7B illustrates the signal of the corresponding timing diagram of FIG. 6F on a finer scale.

Figure 1:
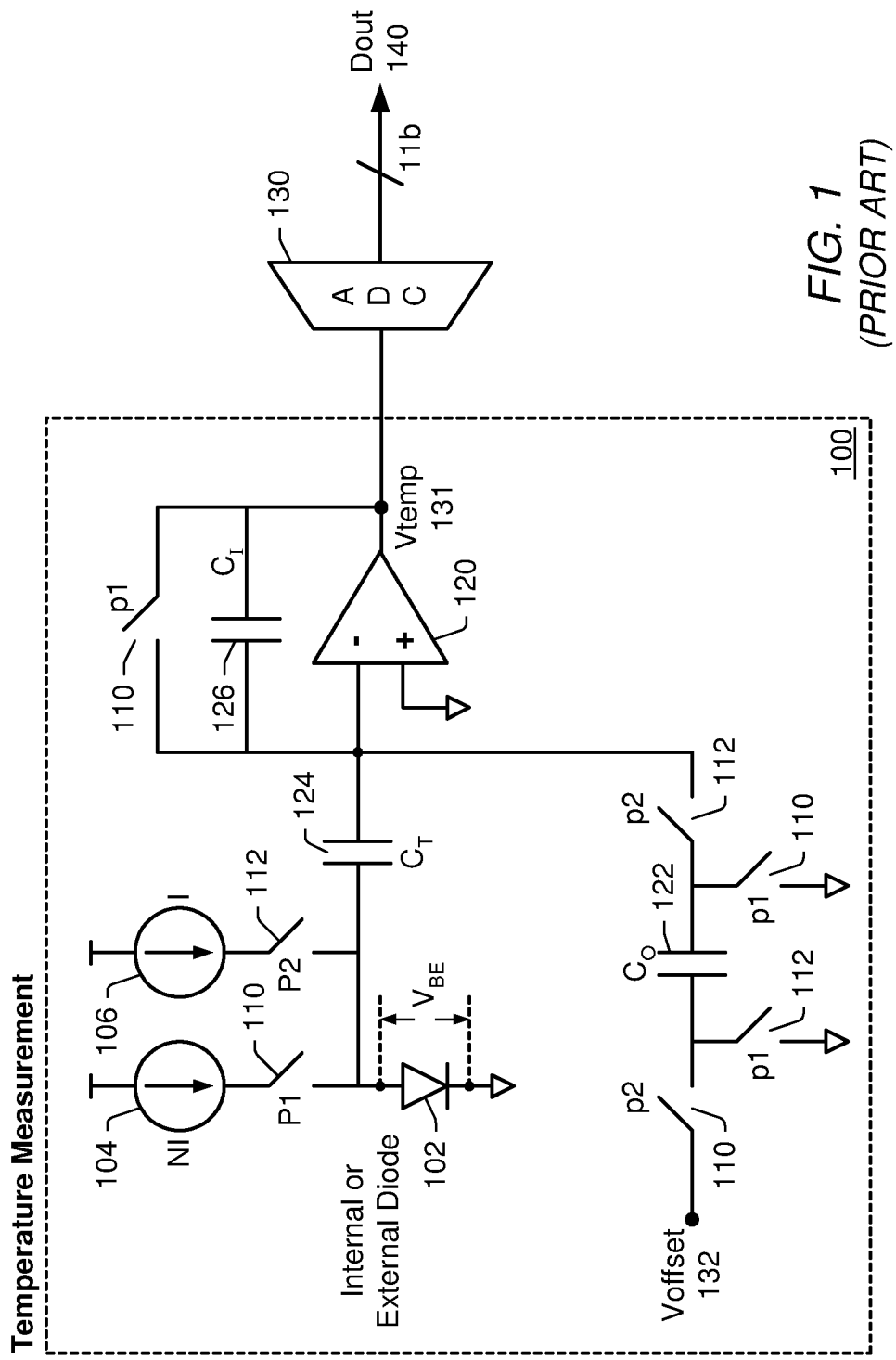
FIG. 1 illustrates a temperature measurement system that utilizes an ADC, in accordance with prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

U.S. patent application Ser. No. 10/624,394 titled "Temperature-to-Digital Converter" invented by Troy L. Stockstad and filed on Jul. 22, 2003, is hereby incorporated by reference in its entirety as though fully and completely set forth herein.

U.S. patent application Ser. No. 10/924,176 titled "Integrated Resistance Cancellation in Temperature Measurement Systems" invented by Scott C. McLeod and filed on Aug. 23, 2004, is hereby incorporated by reference in its entirety as though fully and completely set forth herein.

As used herein, the expression "alternately" is meant to imply passing back and forth from one state, action, or place to another state, action, or place, respectively. For example, "alternately providing a first signal and a second signal" would mean providing the first signal, then providing the second signal, then providing the first signal again, then providing the second signal again, and so on. Similarly, alternately providing a first signal and a second signal at a certain frequency (or rate) means that each signal, whether the first signal or the second signal, is provided once during a time period defined as 1/frequency (or 1/rate, respectively).

A "diode-junction-voltage" ($V_{BE}$) refers to a voltage measured across the junction of a diode, or a difference in voltage between a voltage measured at the anode of the diode junction with respect to a common ground and a voltage measured at the cathode of the diode junction with respect to the common ground. A "change in diode-junction-voltage" ($\Delta V_{BE}$) refers to a change in diode-junction-voltage for a chosen diode, either in time or in different circuit configurations. For example, if in one circuit configuration $V_{BE}$=700 mV for a diode, and in a different circuit configuration $V_{BE}$=655 mV for the diode, then $\Delta V_{BE}$=45 mV for the diode when referencing to the two different circuit configurations. Similarly, for example, if at a time point t1 $V_{BE}$=650 mV for a diode, and at a time point t2 $V_{BE}$=702 mV for the diode, then $\Delta V_{BE}$=52 mV for the diode when referencing time points t1 and t2. "Storing" a $V_{BE}$ or $V_{BE}$ value in an integrator generally refers to developing a charge corresponding to the $V_{BE}$ value within the integrator. "Adding" and/or "subtracting" a $V_{BE}$ or $V_{BE}$ value in the integrator generally refers to increasing and/or decreasing the developed charge within the integrator, correspondingly to the $V_{BE}$ value.

A diode is used as one way of accessing a PN-junction across which voltage measurements to obtain $V_{BE}$ may be made. More generally, diode-junction may also mean PN-junction or NP-junction, which defines the physical attributes of the junction selected for obtaining temperature values while performing voltage measurements. Various embodiments of the circuit are described as utilizing a diode. However, in other embodiments, the operation performed by the diode may be achieved using other circuitry, such as a PN-junction (or NP-junction) present in devices other than a diode, for example bipolar junction transistors (BJTs). Therefore, the terms PN-junction, NP-junction, diode, and diode-junction are used interchangeably, and all respective terms associated therewith may be interpreted accordingly.

Figure 2:
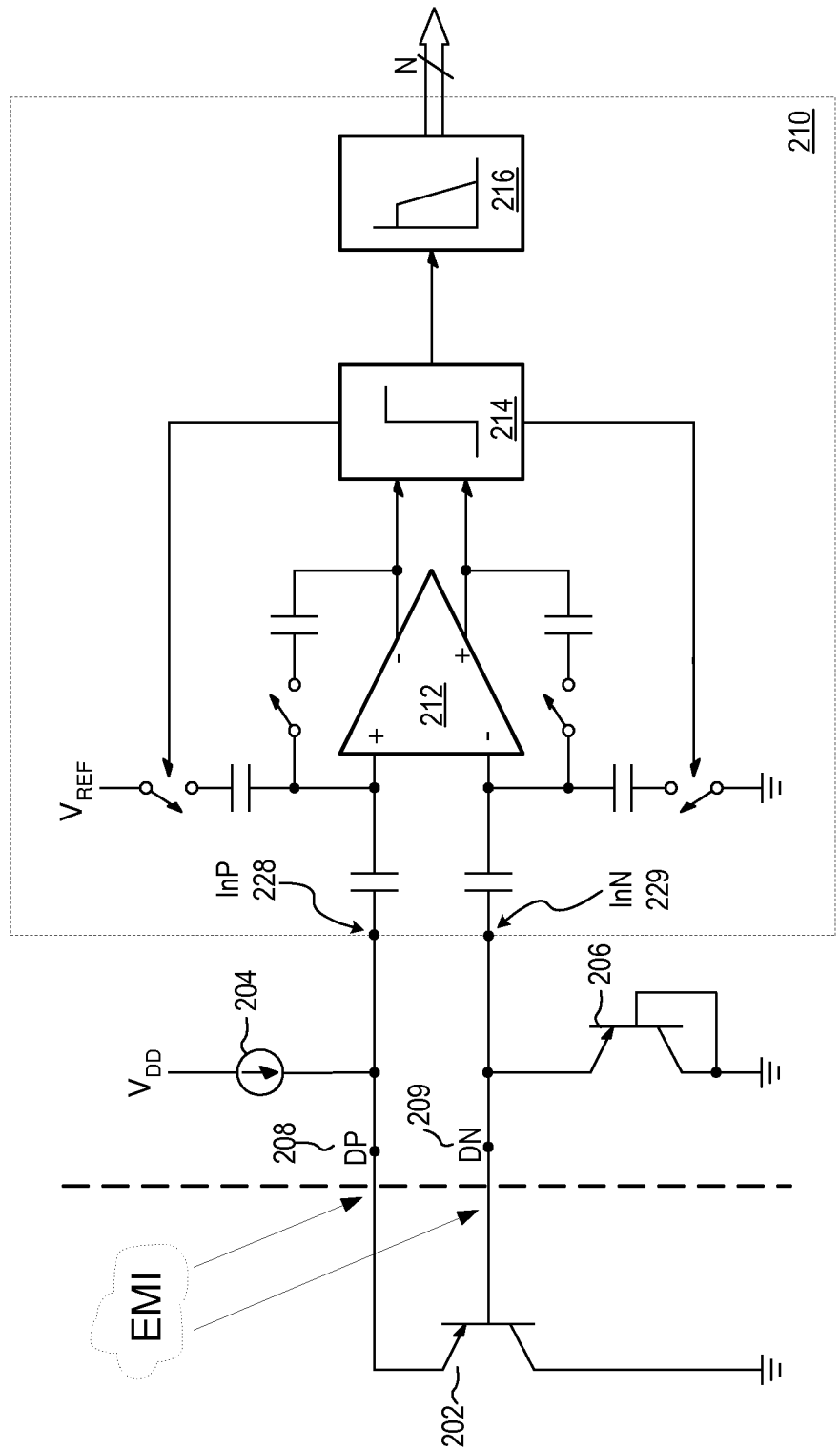
FIG. 2 illustrates one embodiment of a temperature sensor circuit utilizing an internal ADC.

FIG. 2 illustrates one embodiment of a temperature measurement circuit that utilizes an internal ADC to generate a numeric (i.e. digital) reading of the temperature of a directly coupled PN-junction, which may be a diode junction. As shown in FIG. 2, the base-emitter junction of a transistor 202 may be coupled to ADC 210, which may comprise input nodes InP 228, InN 229, amplifier 212, quantizer 214, and decimation filter 216 providing the final digital temperature reading, which may be an N-bit binary number. While certain components of ADC 210 are shown for illustrative purposes, ADC 210 is not restricted to the embodiment shown. Those skilled in the art will appreciate that a number of alternate implementations of ADC 210 are possible, and while such alternate implementations are not shown, they are contemplated.

Current source 204 may be used to force a current into the emitter of transistor 202, thus generating a $V_{BE}$ value across the base-emitter junction of transistor 202. In one embodiment, current source 204 is operable to provide currents of varying values. Thus, applying a sequence of different discrete currents to the base-emitter junction of transistor 202 will result in a $\Delta V_{BE}$ value that may be used in generating the desired temperature readings. As also illustrated in FIG. 2, EMI noise coupling to terminals DP 208 and DN 209 may result in errors at the output of ADC 210. More specifically, in the embodiment shown in FIG. 2, EMI noise coupling to DP 208 may induce a current in transistor 202, leading to erroneous readings of the final temperature value at the output of ADC 210.

In one set of embodiments, a $\Delta V_{BE}$ developed across DP 208 and DN 209 may be obtained by current source 204 forcing a low current into the emitter of transistor 202, then subsequently forcing a corresponding high current into the same emitter. Based on equation (2), $\Delta V_{BE}$ across the base-emitter junction of transistor 202 may then be defined as:

$$\Delta V_{BE} = \eta \frac{kT}{q} * \ln\left(\frac{I_{HIGH}}{I_{LOW}}\right). \quad (3)$$

If $\Delta i$ is used to designate any additional current induced in transistor 202, for example current induced by EMI, then $\Delta V_{BE}$ may be re-written to account for the additional induced current as:

$$\Delta V'_{BE} = \eta \frac{kT}{q} * \ln\left(\frac{I_{HIGH} + \Delta i}{I_{LOW} + \Delta i}\right). \quad (4)$$

The error portion of $\Delta V_{BE}$, i.e. the difference between $\Delta V'_{BE}$ and $\Delta V_{BE}$, may be expressed by:

$$\Delta V'_{BE} - \Delta V_{BE} = \eta \frac{kT}{q} * \left[\ln\left(\frac{I_{HIGH} + \Delta i}{I_{LOW} + \Delta i}\right) - \ln\left(\frac{I_{HIGH}}{I_{LOW}}\right)\right]. \quad (5)$$

If $\Delta T$ is used to designate the error change in temperature (otherwise referred to as the temperature error) due to the additional induced current $\Delta i$, the difference between $\Delta V'_{BE}$ and $\Delta V_{BE}$ may alternately be expressed as:

$$\Delta V'_{BE} - \Delta V_{BE} = \eta \frac{k \Delta T}{q} * \ln\left(\frac{I_{HIGH}}{I_{LOW}}\right). \quad (6)$$

Combining equations (5) and (6), $\Delta T$ may be expressed as:

$$\Delta T = T * \left[\frac{\ln\left(\frac{I_{HIGH} + \Delta i}{I_{LOW} + \Delta i}\right) - \ln\left(\frac{I_{HIGH}}{I_{LOW}}\right)}{\ln\left(\frac{I_{HIGH}}{I_{LOW}}\right)}\right]. \quad (7)$$

In one set of embodiments, $\Delta i$ may assume a sinusoidal form and may be expressed as:

$$\Delta i = A * \sin(\omega). \quad (8)$$

The average value of the temperature error may be obtained by integrating equation (7) over $2\pi$ with respect to $\omega$.

$$\Delta T = \frac{T}{2\pi} \int_0^{2\pi} \left[\frac{\ln\left(\frac{I_{HIGH} + A\sin\omega}{I_{LOW} + A\sin\omega}\right) - \ln\left(\frac{I_{HIGH}}{I_{LOW}}\right)}{\ln\left(\frac{I_{HIGH}}{I_{LOW}}\right)}\right] d\omega. \quad (9)$$

By way of example the value of $I_{HIGH}$ may be designated as 170 µA, and the value of $I_{LOW}$ may be designated as 10 µA, leading to:

$$\Delta T = \frac{T}{2\pi} \int_0^{2\pi} \left[ \frac{\ln\left(\frac{170\mu A + A\sin\omega}{10\mu A + A\sin\omega}\right) - \ln(17)}{\ln(17)} \right] d\omega. \quad (10)$$

Figure 3:
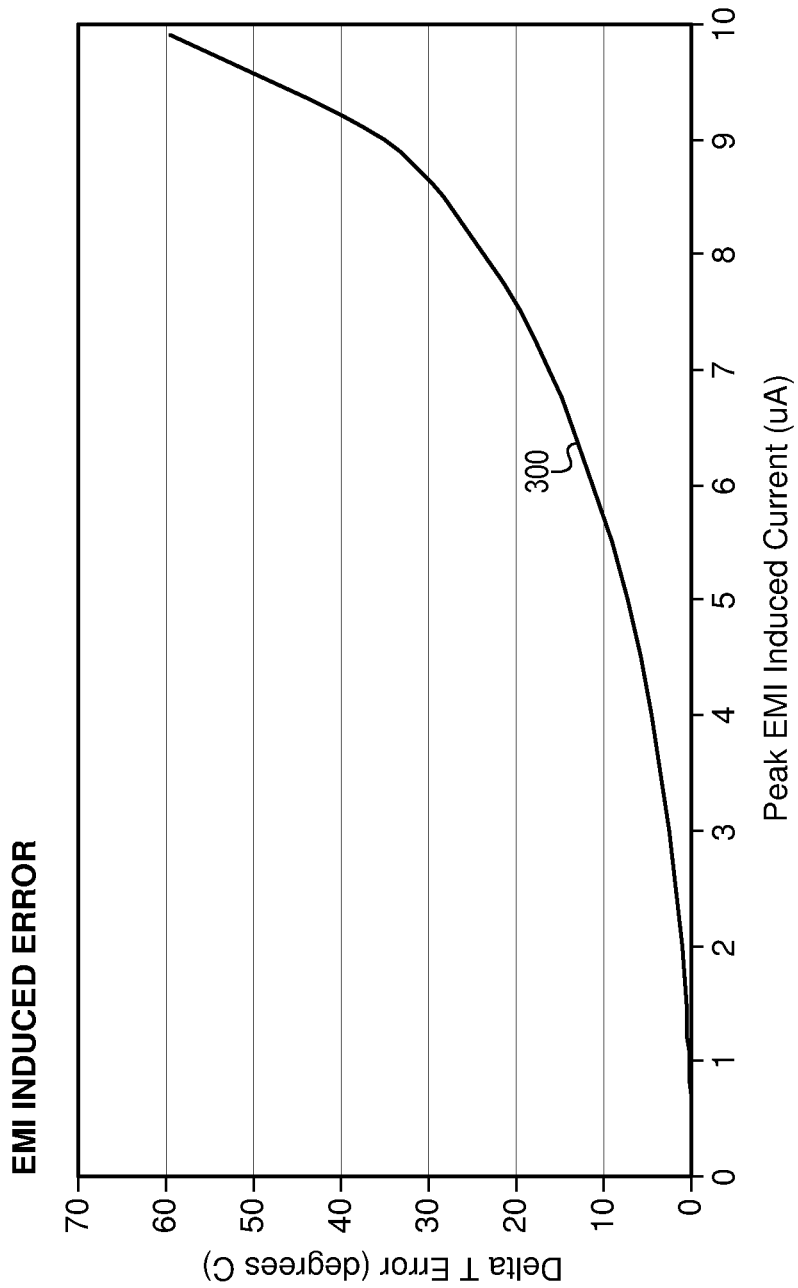
FIG. 3 shows a diagram illustrating the EMI induced temperature error as a function of peak EMI induced current.

FIG. 3 shows a diagram illustrating the EMI induced error ΔT as a function of peak EMI induced current, illustrated by function curve 300. One possible way of minimizing EMI induced temperature error is to add a capacitor across terminals DP 208 and DN 209, which would shunt EMI currents. For many embodiments, the value of a capacitor sufficiently large to make the circuit less susceptible to EMI noise may need to be in the 2200 pF range. However, in embodiments where ADC 210 features a delta-sigma ADC architecture, a maximum allowable input capacitance may be in the 100 pF range due to the sampling time requirements of ADC 210. In other words, a maximum allowable shunt capacitance value may fundamentally result from the settling time requirement of ADC 210, for example when ADC 210 is an internal delta-sigma ADC. For embodiments that employ such ADCS, in order to accommodate an increased input capacitance of approximately twenty times the allowable value (2000 pF range vs. 100 pF range), the number of averages may need to be decreased and the settling time requirement may need to be increased without increasing the over-all conversion time for conversions performed by the ADC.

Figure 4:
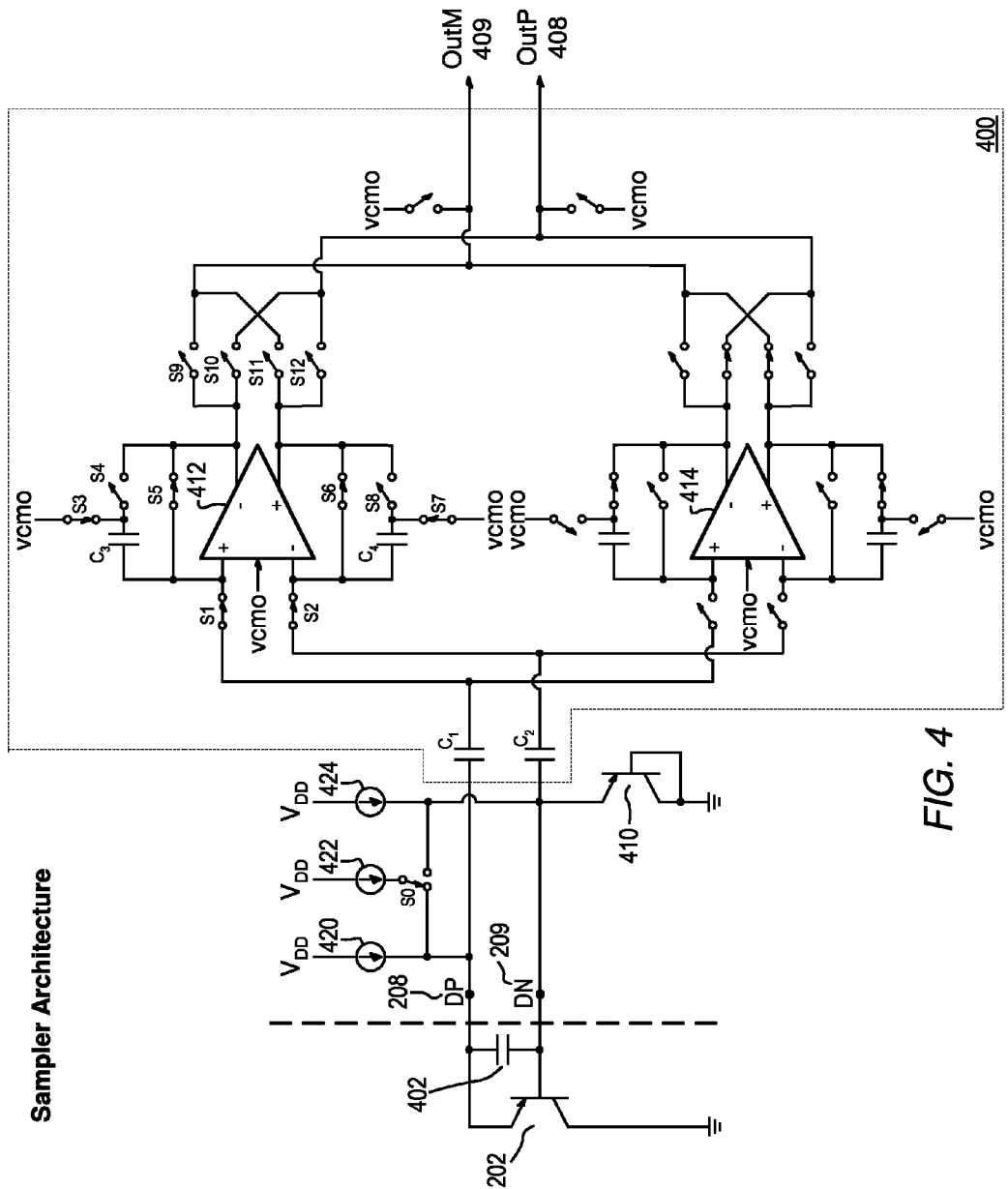
FIG. 4 illustrates one embodiment of a sample-and-hold circuit configured to sample $V_{BE}$ voltages across a PN-junction.

FIG. 4 shows one embodiment where a front-end sample-and-hold circuit 400 is employed to sample the voltage across terminals DP 208 and DN 209 (i.e. the voltage across the base-emitter junction of transistor 202) when a first current (420) associated with the temperature measurement is forced into the emitter of transistor 202. The junction voltage may similarly be sampled for a subsequent different current (a summed combination of currents 420 and 422) that is forced into the emitter of transistor 202. The sample- and hold-circuit may provide the various thus obtained base-emitter junction voltages as $\Delta V_{BE}$ values at its outputs OutM 409 and OutP 408 to an ADC for conversion at the full ADC conversion speed. The overall sample time for each diode voltage may be dependent on the value of the current forced through the emitter of transistor 202, enabling the total conversion time to be appropriately and proportionally divided to allow the maximum settling time of $V_{BE}$ developed across the base-emitter junction of transistor 202 for the lower input currents and the minimum settling time of $V_{BE}$ developed across the base-emitter junction of transistor 202 for the higher input currents. While the embodiment shown features sequentially applying two different currents to the junction, other embodiments with fewer or more current sources providing more than two different currents are possible and are contemplated.

Referring again to FIG. 4, as previously mentioned, OutP 408 and OutM 409 may be coupled to the inputs of an internal ADC of a temperature measurement system, such as inputs InP 228 and InN 229 of ADC 210, respectively, where ADC 210 may be a delta-sigma ADC. As shown in FIG. 4, a capacitor 402 may be coupled across terminals DP 208 and DN 209 to shunt EMI currents that may be induced in transistor 202, and may cause erroneous temperature readings. In order to allow for a sufficiently large value for capacitor 402 to effectively minimize the effects of EMI currents that may be induced in transistor 202, sampler circuit 400 may be configured to sample the voltage between terminals DP 208 and DN 209 at a preferred rate. The preferred rate may be determined in part based on the consideration that the signals at output ports OutM 409 and OutP 408 of sampler circuit 400 provide stable inputs to ADC 210.

The sampling time required for sampling the $V_{BE}$ voltages across the base-emitter junction of transistor 202 and forming a $\Delta V_{BE}$ sample voltage that is provided to ADC 210 across outputs OutM 409 and OutP 408 may be obtained based on the settling times of the $V_{BE}$ voltages. The settling time for a given $V_{BE}$ voltage, with ADC 210 having an N-bit output, may be expressed as:

$$t_s = RC \ast ln(2^N), \quad (11)$$

where, in the embodiment of FIG. 2 and FIG. 4, R represents the dynamic base-emitter junction resistance $r_e$ of transistor 202, and C represents the capacitance value of shunt capacitor 402. The value for $r_e$ may be obtained from known device characteristics of transistor 202 and from equation (1):

$$r_e = \frac{\eta kT}{qI_C}. \quad (12)$$

Substituting $r_e$ for R into equation (11) yields a value for '$t_s$', where '$t_s$' represents the settling time for each voltage sampled at the base-emitter junction of transistor 202. In other words, '$t_s$' is a minimum value for the time required for obtaining an accurate sample value of $V_{BE}$ for a given input current $I_C$.

In one set of embodiments, sampler circuit 400 may be configured to provide samples of $\Delta V_{BE}$ to ADC 210, where each $\Delta V_{BE}$ sample may be developed across the output of amplifier 412 and/or amplifier 414, respectively. In such embodiments, each $\Delta V_{BE}$ sample is based on a first $V_{BE}$ voltage developed across the base-emitter junction of transistor 202 in response to a lower current (420) being forced into the emitter of transistor 202, followed by a second $V_{BE}$ voltage developed across the base-emitter junction of transistor 202 in response to a larger current (a summed combination of currents 420 and 422) being forced into the emitter of transistor 202. It should be noted that alternate configurations for delivering the currents of varying values to the emitter of transistor 202, while not shown, are possible and are contemplated. For example, instead of the larger current being a summed combination of currents 420 and 422 it may be provided by a single current source, and so on. Alternately, more than two different current values may be forced into the emitter of transistor 202 in order to form the $\Delta V_{BE}$ voltage samples.

Let '$t_{st}$' designate the minimum time required to form a stable $\Delta V_{BE}$ voltage sample that will be provided to ADC 210 across outputs OutM 409 and OutP 408, where '$t_{st}$' is obtained by summing the respective '$t_s$' values corresponding to the $V_{BE}$ voltages sampled across the base-emitter junction of transistor 202 and used in developing the $\Delta V_{BE}$ voltage sample. Then, if ADC 210 has a preferred sampling frequency '$F_p$' that yields a per-$\Delta V_{BE}$-sample time period lower than the largest expected value of '$t_{st}$', sampling circuit 400 may be operated to sample $V_{BE}$ voltage values at a rate that yields a per-$\Delta V_{BE}$-sample time period that is at least '$t_{st}$'.

The operation of sampler circuit 400 according to one embodiment will now be described. In this embodiment, ADC 210 is a delta-sigma ADC and is operated to convert $2^N$ $\Delta V_{BE}$ samples for an N-bit digital (numeric) output corresponding to the temperature of the base-emitter junction of transistor 202. In the configuration shown, as part of the conversion process ADC 210 may average out AC components of noise that may result from a noisy reference voltage source, thermal noise in the capacitor components, and/or active components in ADC 210. Sampler circuit 400 used in combination with shunt capacitor (which may be in the nF range) may operate to substantially reduce DC components of noise that may be caused primarily by EMI induced current in transistor 202. A single sampling period for sampler circuit 400 is designated as the time period allocated to sampler circuit 400 to form a $\Delta V_{BE}$ voltage sample at the differential output of amplifier 412 and/or 414. The sampling period may be selected to be sufficiently large based on '$t_{st}$', according to the previously described principles.

The timing information corresponding to the operation of sampler circuit 400 according to one embodiment is shown in FIGS. 5A-5F, with corresponding scaled timing diagrams in FIGS. 6A-6F. As shown in the illustrated timing diagrams, a signal is asserted by transitioning from a zero (or low) value to a high value. However, in alternate embodiments one or more signals may be asserted by transitioning from a high value to a low and/or zero value. FIG. 5A illustrates the sampling clock signal for ADC 210, which is selected to be 100 KHz by way of example. FIG. 5B illustrates the start signal for the overall sampling/conversion process, which, when asserted, enables sampler circuit 400 to begin operation. When the signal shown in FIG. 5C is asserted, it enables ADC 210 to begin operation. The time elapsed between the asserting of the signal of FIG. 5B and the signal of FIG. 5C may constitute one sampling period of sampling circuit 400.

By way of example, the operation of sampler circuit will be described for the circuit section that contains amplifier 412. At the start of the sampling process, all switches, including switches S1-S12, in sampler circuit 400 are open. A low-value current 420 (which is selected to be 10 µA for purposes of illustration) may be injected into the emitter of transistor 202, resulting in a $V_{BE}$ voltage developed across nodes DP 208 and DN 209, with corresponding charges developed across capacitors $C_1$ and $C_2$, respectively. Switches S1, S2, S5, S6, and S3 and S7 may then be closed. Thus, DP 208 and DN 209 may be coupled to the non-inverting and inverting inputs of amplifier 412 via input capacitors $C_1$ and $C_2$, respectively.

With S1 and S2 closed, the voltage is allowed to settle across the inputs of amplifier 412, and by virtue of S5 and S6, and S3 and S7 being closed, the outputs of amplifier 412 will each reflect a value of vcmo, with any offset voltage $V_{OFF}$ that may affect the output equally divided between the two terminals. The offset voltage $V_{OFF}$ may be eliminated (zeroed) from the output terminals of amplifier 412 by opening switches S5, S6, S3 and S7, and closing S4 and S8, which results in each output of amplifier 412 settling at a voltage level of vcmo.

Once the outputs of amplifier 412 have each settled to a voltage level of vcmo, the current forced into the emitter of transistor 202 may be switched to a multiple of the first current, administered in this case by flipping current switch S0 to combine the currents 420 and 422, which, for purposes of illustration, is chosen to be 160 µA, resulting in a total current of 170 µA flowing into the emitter of transistor 202. In FIG. 5D, each pulse is indicative of S0 being operated to combine the currents from current sources 420 and 422, with the de-asserted portions of the signal indicating that S0 is being operated to couple current source 420 to the emitter of transistor 202, thus providing a current of 10 µA. By injecting the larger current, the $V_{BE}$ voltage across DP 208 and DN 209 will change, and charge will be injected into capacitors $C_3$ and $C_4$, respectively. In one embodiment, the ratio of $C_3$ to $C_1$ and $C_4$ to $C_2$ is selected such that the voltage change appearing across the outputs of amplifier 412 resulting from the respective charges injected into $C_3$ and $C_4$ is amplified. Alternate embodiments may contain values for $C_3$ and $C_4$ such that the voltage change is not gained-up. In either case, the voltage across the outputs of amplifier 412 will now correspond to the change in voltage $\Delta V_{BE}$ for the base-emitter junction of transistor 202.

Now, by opening S1 and S2, nodes DP 208 and DN 209 may be decoupled from amplifier 412, resulting in the $\Delta V_{BE}$ voltage being held across the output terminals of amplifier 412. FIG. 5F illustrates the settling time of the $V_{BE}$ voltage developed across the base-emitter junction of transistor 202 each time either 10 µA or 170 µA is forced into the emitter (corresponding to FIG. 5D as described above). Sampler circuit may now be operated to provide the current $\Delta V_{BE}$ voltage sample held at the outputs of amplifier 412 to ADC 210 via output ports OutM 409 and OutP 408, by alternately closing and opening switch pairs S9/S12 and S10/S11. The rate at which these switch pairs are toggled may be commensurate with the preferred sampling frequency $F_p$ of ADC 210. Because the voltage value actually provided to ADC 210 is $\Delta V_{BE}$, not $V_{BE}$, switches S9 through S12 are operated to alternately provide $\Delta V_{BE}$ and $-\Delta V_{BE}$ across output terminals OutM 409 and OutP 408. For example, when S9 and S12 are closed, and S10 and S11 are open, the non-inverting output terminal of amplifier 412 is coupled to non-inverting output terminal OutP 408 while the inverting output terminal of amplifier 412 is coupled to inverting output terminal OutM 409. In contrast, when S10 and S11 are closed, and S9 and S12 are open, the non-inverting output terminal of amplifier 412 is coupled to the inverting output terminal OutM 409 while the inverting output terminal of amplifier 412 is coupled to non-inverting output terminal OutP 408.

While S9 through S12 are operated to provide the $\Delta V_{BE}$ samples to ADC 210, the circuit section of sampler circuit 400 that contains amplifier 414 may be operated to develop the next $\Delta V_{BE}$ sample across the outputs of amplifier 414 in a manner similar to that described above for the circuit section that contains amplifier 412. Thus, while amplifier 414 is coupled to DP 208 and DN 209, amplifier 412 is operated to provide the currently residing $\Delta V_{BE}$ voltage across its output terminals to ADC 210, and conversely, while amplifier 412 is coupled to DP 208 and DN 209, amplifier 414 is operated to provide the currently residing $\Delta V_{BE}$ voltage across its output terminals to ADC 210. In each case, only one of the two amplifiers 412 and 414 will be coupled to DP 208 and DN 209 at a time.

When decoupling amplifier 412, for example, S1 and S2 may be opened as soon as the $V_{BE}$ voltage developed across the base-emitter junction of transistor 202 as a result of the higher current (170 µA) being forced into the emitter settles to a stable value. FIGS. 6A through 6F show in greater detail the corresponding waveforms of FIGS. 5A through 5F, respectively. As illustrated in FIG. 6D, the asserted signal indicates an injection of the higher current (170 µA) into the emitter of transistor 202, as also indicated in FIG. 6F, which shows the $V_{BE}$ signal developed as a result of the injected current. The settling time for $V_{BE}$ will be shorter when injecting the larger current (170 µA), as shown by the faster rise time (steeper angle) of the $V_{BE}$ pulse in FIG. 6D. When the smaller current (10 µA) is injected, as indicated by the signal of FIG. 6D transitioning from a high state to a low state, the settling time of $V_{BE}$ will be longer, as indicated by the longer fall time of the $V_{BE}$ pulse in FIG. 6F.

FIG. 5E and corresponding FIG. 6E illustrate the operating of switches S9 through S12 (and the corresponding switches for amplifier 414) while providing a given $\Delta V_{BE}$ sample to ADC 210. As indicated, the $\Delta V_{BE}$ sample voltage signal, as shown in FIGS. 5E and 6E, follows the sampling clock of ADC 210 illustrated in FIG. 5A and correspondingly in FIG.

6A. For a chosen value of 10 µA (or 5 µA) for current source 420 and 160 µA for current source 422, and a value of 7 nF for shunt capacitor 402, the sampling time for each $\Delta V_{BE}$ ('$t_{st}$') voltage sample may be set to 320 µsec. However, functional values for capacitor 402 and the sampling time may be set as required by considerations of EMI induced current in transistor 202 and the preferred operating frequency of ADC 210, according to equations (3) through (12) as previously set forth. The sampling time allocated for forming and alternately providing a $\Delta V_{BE}$ voltage sample at output terminals OutM 409 and OutP 408 is illustrated in FIG. 5E. In the embodiment shown, an example sampling period 502 extends to 320 µsec, during which one of amplifiers 412 and 414 in sampler circuit 400 is operated to form a $\Delta V_{BE}$ sample voltage, and the other one is operated to provide the $\Delta V_{BE}$ sample currently residing across its outputs to ADC 210. A delay equivalent to a full sampling period is available to form the first $\Delta V_{BE}$ sample before ADC 210 is engaged, as previously mentioned and shown in FIG. 5C (and corresponding FIG. 6C), wherein ADC 210 doesn't begin operating until the control signal shown in FIG. 5C is asserted.

In one embodiment, sampling period 502 may be divided according to the rise and fall time of the $V_{BE}$ signal, as illustrated in FIG. 5F and corresponding FIG. 6F, for sampling $V_{BE}$ for the 10 µA (or 5 µA) current and the 170 µA current, respectively. That is, switches S1 through S12 (and corresponding switches for amplifier 414) may be opened and closed at a rate corresponding to the minimum '$t_s$' required for $V_{BE}$ to stabilize for each corresponding applied input current. For example, the combination of switch positions required for sampling $V_{BE}$ for the lower current may be held for a longer portion of sampling period 502, while the combination of switch positions required for sampling $V_{BE}$ for the higher current may be held for a shorter portion of sampling period 502. Thus, sampler circuit 400 may take full advantage of the dynamic nature of emitter resistance $r_e$ by making the duty cycle of sampling period 502 proportional to the respective settling times of the $V_{BE}$ signal for the different input currents. For example, a settling time of 300 µsec may be allocated for $V_{BE}$ settling when the input current is 10 µA, and 20 µsec may be allocated for $V_{BE}$ settling when the input current is 170 µA.

It follows that in this embodiment, if the operating frequency of the clock for ADC 210 is 100 KHz, shunt capacitor 402 is selected to be 7 nF, and sampling period 502 is designated to be 320 µsec, then sampler circuit 400 may obtain and provide 64 distinct $\Delta V_{BE}$ samples to ADC 210 for producing a numeric 11-bit value corresponding to the measured temperature of the base-emitter junction of transistor 202. Furthermore, each $\Delta V_{BE}$ sample may be provided to ADC 210 at the ADC 210 operating frequency of 100 KHz for the duration of a full sampling period of 320 µsec, during which a value of $\Delta V_{BE}$ and $-\Delta V_{BE}$ are provided to ADC 210 on each alternate clock cycle. FIG. 7A and FIG. 7B show signals 5E/6E and 5F/6F, respectively, in more detail on a finer scale, illustrating the relationship between $V_{BE}$ settling time for the different input currents (FIG. 7B) and the control signal operating switches S19 through S12 (and corresponding switches for amplifier 414—FIG. 7A).

It should also be noted that transistor 410 and current source 424 (which may be selected to provide a current of identical value to current source 420) are configured as shown in FIG. 4 to provide stabilization of the current in transistor 410. Parts or the whole of the whole of the circuit portion comprising transistor 410 and current source 424 may be omitted, and those skilled in the art will appreciate that alternate methods may or may not be employed to stabilize the voltage at node DN 209 as required.

Thus, various embodiments of the systems and methods described above may facilitate the design of a temperature sensor circuit that utilizes a local or remote PN-junction for obtaining temperature readings and performing analog to digital conversion concurrently with sampling $V_{BE}$ voltages developed across the PN-junction in response to applied currents of varying magnitude. Accordingly, the temperature sensor circuit may use an ADC, for example a delta-sigma ADC, and take advantage of the ability of the ADC to average out AC components of errors introduced by a noisy reference voltage, noise from active components in the ADC, and/or thermal capacitor noise. Concurrently, the temperature sensor circuit may also minimize the DC component of errors introduced by current(s) induced in the PN-junction by EMI. Optimized, across-the-board error reduction and measurement fidelity and consistency may be achieved using a sampling circuit in conjunction with a shunt capacitor coupled across the PN-junction, with the sampler circuit providing $\Delta V_{BE}$ samples to the ADC, and the ADC sampling/converting the thus provided $\Delta V_{BE}$ voltages to generate an N-bit number representative of the measured temperature of the PN-junction.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method comprising:
    sampling output signals generated by a semiconductor device having a specified, substantially non-linear input-output characteristic that varies with temperature and being subject to effects of electromagnetic interference (EMI), wherein said sampling comprises obtaining the output signals at a pair of output terminals of the semiconductor device;
    generating specified signals from the output signals;
    successively providing each respective one of the specified signals to a converter circuit, comprising providing each respective one of the specified signals for a respective specified time period that is longer than a sampling period of the converter circuit; and
    the converter circuit receiving the specified signals, averaging the received specified signals, and producing a numeric value based on the averaged received specified signals, wherein the numeric value corresponds to a temperature of the semiconductor device.

2. The method of claim 1, wherein said generating the specified signals comprises generating each subsequent respective one of the specified signals during the respective specified time period when a previously generated respective one of the specified signals is provided to the converter circuit.

3. The method of claim 1, further comprising successively providing to the semiconductor device during each respective specified time period at least a first input signal and a second input signal that differ in magnitude, wherein the output signals comprise a first output signal corresponding to the first input signal and a second output signal corresponding to the second input signal;
    wherein the first output signal has a first settling time and the second output signal has a second settling time.

4. The method of claim 3, wherein the first input signal and the second input signal comprise current signals, wherein the semiconductor device comprises a base-emitter junction, wherein each of the output signals is a base-emitter voltage (VBE) signal developed across the base-emitter junction, and wherein each of the specified signals is a voltage difference between two successive VBE signals (ΔVBE).

5. The method of claim 4, wherein the base-emitter junction is comprised in one of:
a diode; and
a BJT.

6. The method of claim 1, wherein the semiconductor device is one of:
a diode; and
a BJT;
wherein the output signals are VBE signals, and wherein the specified signals are ΔVBE signals.

7. The method of claim 1, wherein the converter circuit is an analog to digital converter (ADC).

8. The method of claim 7, wherein the ADC is a delta-sigma ADC comprising a switched capacitor integrator configured to perform said averaging the received specified signals.

9. The method of claim 1, further comprising:
providing to the converter circuit an inverse of the respective one of the specified signals during each specified time period.

10. The method of claim 9, further comprising:
alternately providing the respective one of the specified signals and the inverse of the respective one of the specified signals to the converter circuit during the respective specified time period.

11. A system comprising:
a sampler circuit having input terminals and output terminals, wherein the input terminals are configured to couple to corresponding terminals of a semiconductor device, the semiconductor device having a specified, substantially non-linear input-output characteristic that varies with temperature and being subject to effects of electromagnetic interference (EMI); and
a converter circuit configured to operate at a first frequency and having input ports configured to couple to the output terminals of the sampler circuit;
wherein the sampler circuit is configured to sample output signals generated by the semiconductor device and generate samples corresponding to the output signals,
wherein the sampler circuit is configured to provide to the converter circuit each respective one of the samples for a specified time period that is longer than a period corresponding to the first frequency;
wherein the converter circuit is configured to receive the samples from the sampler circuit, and produce a numeric value based on an average of the received samples, wherein the numeric value corresponds to a temperature of the semiconductor device.

12. The system of claim 11, wherein the sampler circuit comprises a pair of operational amplifiers (op-amps);
wherein the input terminals of the sampler circuit are configured to couple respective inputs of each op-amp to the corresponding terminals of the semiconductor device, and the output terminals are configured to couple respective outputs of each op-amp to the input ports of the converter circuit; and
wherein one of the op-amps is configured to generate, during each specified time period, a next respective one of the samples concurrently with the other op-amp providing to the converter circuit an existent respective one of the samples generated during an immediately preceding specified time period.

13. The system of claim 11, further comprising one or more input devices configured to successively provide to the semiconductor device, during each specified time period, at least a first input signal and a second input signal that differ in magnitude, wherein the output signals comprise a first output signal corresponding to the first input signal and a second output signal corresponding to the second input signal;
wherein the first output signal has a first settling time and the second output signal has a second settling time.

14. The system of claim 13, wherein the one or more input devices comprise one or more current sources, wherein the first input signal and the second input signal comprise current signals, wherein the semiconductor device comprises a base-emitter junction, wherein each of the output signals is a base-emitter voltage signal developed across the base-emitter junction, and wherein each of the samples is a voltage difference between two successive base-emitter voltage signals.

15. The system of claim 14, wherein the base-emitter junction is comprised in one of:
a diode; and
a bipolar junction transistor (BJT).

16. The system of claim 11, wherein the semiconductor device is one of:
a diode; and
a BJT;
wherein the output signals are base-emitter voltage signals, and wherein the samples are voltage difference signals derived from a voltage difference between two successive base-emitter voltage signals.

17. The system of claim 11, wherein the converter circuit is an analog to digital converter (ADC).

18. The system of claim 17, wherein the ADC is a delta-sigma ADC comprising a switched capacitor integrator configured to generate the average of the received samples.

19. The system of claim 11, wherein the sampler circuit is configured to provide to the converter circuit, during each specified time period, an inverse of the respective one of the samples.

20. The system of claim 19, wherein the sampler circuit is configured to alternately provide to the converter circuit, during each specified time period, the respective one of the specified signals and the inverse of the respective one of the specified signals.

* * * * *